US006269404B1

(12) United States Patent
Hart et al.

(10) Patent No.: US 6,269,404 B1
(45) Date of Patent: Jul. 31, 2001

(54) VIRTUAL NETWORK ARCHITECTURE FOR CONNECTIONLESS LAN BACKBONE

(75) Inventors: John H. Hart, Saratoga; W. Paul Sherer, Sunnyvale, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/226,086

(22) Filed: Jan. 5, 1999

Related U.S. Application Data

(63) Continuation of application No. 08/683,570, filed on Jul. 15, 1996, now Pat. No. 6,041,166, which is a continuation-in-part of application No. 08/502,835, filed on Jul. 14, 1995, now Pat. No. 5,752,003.

(51) Int. Cl.[7] .................................................. G06F 15/173
(52) U.S. Cl. ............................................ 709/238; 709/245
(58) Field of Search .................................... 709/201, 220, 709/230, 236, 238, 245, 249, 250; 370/909, 409, 351, 401, 229, 390, 403, 355

(56) References Cited

U.S. PATENT DOCUMENTS

| | | | |
|---|---|---|---|
| 4,975,906 | 12/1990 | Takiyasu et al. | 370/85.13 |
| 5,214,646 | 5/1993 | Yacoby | 370/85.14 |
| 5,280,476 | 1/1994 | Kojima et al. | 370/60.1 |
| 5,280,481 | 1/1994 | Chang et al. | 370/85.13 |
| 5,315,582 | 5/1994 | Morizono et al. | 370/16 |
| 5,321,693 | 6/1994 | Perlman | 370/85.13 |
| 5,321,694 | 6/1994 | Chang et al. | 370/85.13 |
| 5,329,527 | 7/1994 | Ujihashi et al. | 370/85.13 |
| 5,345,558 | 9/1994 | Opher et al. | 395/200 |
| 5,361,256 | * 11/1994 | Doeringer et al. | 370/60 |
| 5,390,184 | 2/1995 | Morris | 370/94.2 |
| 5,394,402 | 2/1995 | Ross | 370/94.1 |
| 5,408,469 | 4/1995 | Opher et al. | 370/60.1 |
| 5,444,702 | 8/1995 | Burnett et al. | 370/60.1 |
| 5,519,704 | 5/1996 | Farinacci et al. | 370/85.13 |
| 5,548,646 | 8/1996 | Aziz et al. | 380/23 |
| 5,550,816 | 8/1996 | Hardwick et al. | 370/60 |
| 5,583,865 | 12/1996 | Esaki et al. | 370/397 |
| 5,600,644 | 2/1997 | Chang et al. | 370/404 |

(List continued on next page.)

OTHER PUBLICATIONS

LAN Emulation SWG Drafting Group, "LAN Emulation Over ATM Specification—Version 1.0", *ATM Forum*, pp. 1–139. (Undated prior art).

(List continued on next page.)

*Primary Examiner*—Mehmet B. Geckil
(74) *Attorney, Agent, or Firm*—Wilson Sonsini Goodrich & Rosati

(57) ABSTRACT

Network traffic management is achieved based on automatically setting up a plurality of virtual networks (VNETs) within a single large virtual LAN. Multicast/broadcast traffic is confined to the VNET of the source, without imposing constraints on layer two addressing within the virtual LAN. VNETs are domains of users of a virtual LAN which include members of logical networks defined at layer three or higher. One method includes transferring a multi-destination packet originating from a particular node in the virtual LAN by tunnelling across a connectionless backbone network to a virtual net server. The virtual net server translates the multi-destination packet to a plurality of tunneled messages identifying nodes authorized to receive multi-destination packets from members of the particular VNET which originated the packet. The tunneled messages are then forwarded from the virtual net server to the authorized nodes. This way, multi-destination packets, such as advertisement or discovery packets, are confined to a single VNET. By confining the multi-destination packets to a single VNET, unicast packets generated within the virtual LAN are then also naturally confined to that VNET.

26 Claims, 9 Drawing Sheets

U.S. PATENT DOCUMENTS

| | | | |
|---|---|---|---|
| 5,633,869 | | 5/1997 | Burnett et al. ............... 370/396 |
| 5,659,542 | | 8/1997 | Bell et al. ..................... 370/496 |
| 5,666,487 | | 9/1997 | Goodman et al. ........ 395/200.76 |
| 5,684,800 | | 11/1997 | Dobbins et al. ................ 370/401 |
| 5,748,626 | * | 5/1998 | Esaki et al. .................... 370/355 |
| 5,752,003 | | 5/1998 | Hart ............................... 395/500 |
| 5,777,994 | * | 7/1998 | Takihiro et al. ................ 370/395 |
| 5,802,056 | * | 9/1998 | Ferguson et al. .............. 370/403 |
| 5,825,772 | * | 10/1998 | Dobbins et al. ................ 370/396 |
| 5,903,559 | * | 5/1999 | Acharya et al. ................ 370/355 |
| 5,914,938 | * | 6/1999 | Brady et al. .................... 370/254 |
| 5,923,654 | * | 7/1999 | Schnell .......................... 370/390 |
| 5,935,268 | * | 8/1999 | Weaver .......................... 714/758 |
| 6,041,166 | * | 3/2000 | Hart et al. ...................... 709/238 |
| 6,058,429 | * | 5/2000 | Ames et al. .................... 709/242 |

OTHER PUBLICATIONS

Novell NetWare Network Computing Products 3.12, "NetWare 3.12 Concepts", Novell Inc., U.S.A., Part No.: 100–001715–001, Jul. 1993, pp. 158–163.

Novell NetWare Network Computing Products 3.12, "TCP/IP Transport Supervisors's Guide", Novell Inc., U.S.A. Part No.: 100–001866–001, May 1993, pp. B–15–B22.

Simpson, W., "IP in IP Tunneling", Request for Comments #1853, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

"Packet Services", http://www.cisco.com/warp/public/732/Tech/pksrv tc.htm, Dec. 1995, 32 pages.

Deering, S., "Host Extensions for IP Multicasting", Stanford University, Aug. 1989, RFC 1112, pp. 1–16.

Egevang, K., "The IP Network Address Translator (NAT)", Cray Communications, RFC 1631, May 1994, 10 pages.

"All About . . . Multicast Wide Area Network Services", http://www.starburstcom.com/mcast.htm, Feb. 1997, pp. 1–11.

Baker, F., "Requirements for IP Version 4 Routers", Cisco Systems, Jun. 1995, RFC 1812, 175 pages.

* cited by examiner

VIRTUAL NETWORK ARCHITECTURE FOR CONNECTIONLESS LAN BACKBONE

This application is a continuation of U.S. patent application Ser. No. 08/683,570, filed Jul. 15, 1996 now U.S. Pat. No. 6,041,166, invented by John H. Hart and Paul Sherer, entitled, *Virtual Network Architecture For Connectionless LAN Backbone,* and which is incorporated herein by reference in its entirety and which is a continuation-in-part of application Ser. No. 08/502,835, filed on Jul. 14, 1995 now U.S. Pat. No. 5,752,003, invented by John H. Hart, entitled, *Virtual Network Architecture For Connectionless LAN Backbone.*

BACKGROUND OF THE INVENTION

1. Field of the Invention

The present invention relates to data communication networks which consist of a number of local area network (LAN) segments interconnected to form a virtual LAN environment; and more particularly to methods for managing data flow in such networks across a connectionless LAN backbone.

2. Background of the Invention

Historically, networks have been designed around the wired LAN segment as the basic technique for establishing network user groups. Standard network layer protocols define logical networks with a single layer two (data link layer) LAN segment in mind, with layer two bridging and layer three (network layer) routing functions used for moving data between LAN segments and layer three logical networks. However, with the emerging ATM LAN emulation mode and other LAN switching systems, the layer two boundaries become less controlled, giving rise to the concept of a virtual LAN. See, U.S. Pat. No. 4,823,338 to Chan et al., and an IEEE standard referred to as 802.1D. Nodes in a single layer two virtual LAN are found on different physical LAN segments but have the appearance to layer two processes (data link layer processes using medium access control MAC addresses) of residing on a single layer two LAN segment. This allows a unicast packet to propagate across the virtual LAN to any other station in the virtual LAN. Also, multi-destination packets generated on a particular LAN segment propagate throughout a number of interconnected LAN segments to ensure that all possible members of the virtual LAN receive the packet.

Within virtual LAN domains, multicast/broadcast frames are used by higher layer "discovery" or "advertisement" procedures to locate other systems or services within the virtual LAN domain. Systems send "data" to other systems using unicast MAC address which are either known in advance or learned through multicast/broadcast discovery and advertisement procedures. Systems send "multi-media data" using either unicast or multicast frames with special protocols to improve throughput or latency, as required.

Large virtual LANs create large multicast/broadcast domains; and the burden on the backbone network of transmitting all these multi-destination packets begins to impact overall system performance. More importantly, the users of the virtual LAN become burdened by a large number of multi-destination packets that must be inspected and processed, even when the packet is simply discarded. In fact, several layer three network protocols may co-exist in a single virtual LAN, resulting in much traffic which is irrelevant to many users in the virtual LAN, which must nonetheless process the traffic to discover that the network layer data unit carried in it relates to a protocol it does not use.

Commonly used network layer protocols include the internet protocol (IP) originally developed under DARPA, the interpacket exchange protocol (IPX) published by Novell, the Xerox network system (XNS) published by Xerox, the Banyan VINES protocol, the NetBIOS protocol published by IBM and Microsoft, Apple Talk published by Apple Computer, and the DECNet protocol published by Digital Equipment Corporation. Many network layer protocols create protocol specific domains based on the logical network identifiers. For example, the IP protocol establishes "subnet" domains based on the network number portion, and extensions, of the IP address of the frame. The IPX protocol creates logical networks based on the internal network number assigned to servers in the network. Apple Talk creates "zones". The NetBIOS protocol does not support multiple domains within a single LAN or emulated LAN, and can thus be considered to define a single (or "null") logical network at layer three, by default. These protocol specific logical networks defined at layer three, or higher layers, are called virtual networks, or VNETs in the present application. By the nature of virtual LANs according the prior art, the broadcast/multicast boundaries of the virtual LAN and of the VNETs are equal. Thus, as mentioned above, multicast/broadcast traffic for IPX networks will be received and processed by nodes which are members of an IP subnet, if both nodes fall in the same virtual LAN.

Prior art techniques have arisen to divide networks into several virtual LANs. U.S. Pat. No. 5,394,402 to Ross describes a virtual LAN architecture in a network which includes a backbone using a synchronous transfer mode (ATM) switching. The virtual LAN groupings act to limit the size of the multicast/broadcast domains by constraining the layer two addressing within the virtual LAN, and thus help manage the amount of multicast/broadcast packets which must be handled by a user of the network. To cross virtual LAN boundaries, internetworking devices providing layer three routing functions are required. Thus, when a change is made in a network having a number of virtual LANs, such as a new node being added, or a user moving from one LAN segment to another LAN segment in a different virtual LAN, the VNETs must be reconfigured for the new or moved node, such as by assigning a new layer three address to the node and the like. This complication has effects throughout the network, as the internetworking devices in the system need to learn the new information, and to learn that the old information in the case of a moved node, is obsolete. Further, individual users of the virtual LANs which may have cached the old layer two MAC address of the moved node, will lose track of the node, as it will not be able to send a packet across the virtual LAN boundary with the cached layer two MAC address. Also, the use of several virtual LANs within an organization, may place constraints on layer three network definition. For instance, the IPX network number used in the VNET of a first virtual LAN should not be used in the VNET of a second virtual LAN, because if a node moves from the first to the second, the moved node might erroneously access resources in the VNET of new virtual LAN with the network number of the VNET in old virtual LAN.

Thus, dividing a network into a number of virtual LANs, while having some benefits, also introduces complexity which may offset the benefits. It is desirable therefore to provide a more elegant method for managing traffic in large virtual LANs.

SUMMARY OF THE INVENTION

According to the present invention, network traffic management is achieved based on automatically setting up a plurality of VNETs within a single large virtual LAN. Multicast/broadcast traffic is confined to the VNET of the source, without imposing constraints on layer two addressing within the virtual LAN. Thus, when a node is moved within the network from one segment to another, it remains within the same virtual LAN, so that it may keep its layer three address or addresses, and unicast packets addressed to it from other users of the virtual LAN find their destination. Furthermore layer three network configuration is unconstrained.

The present invention can be characterized as a method for managing traffic in a network based on a set of local area network segments interconnected as a virtual LAN, and in which nodes on respective LAN segments in the set are members of VNETs. The method includes tunneling a multi-destination packet originating from a particular node in the virtual LAN, encapsulated, or otherwise reformatted, as a single destination message to a virtual net server. The virtual net server translates the multi-destination packet to a plurality of directed messages identifying nodes authorized to receive multi-destination packets from members of the particular VNET which originated the packet. The directed messages are then forwarded from the virtual net server to the authorized nodes. This way, multi-destination packets, such as advertisement or discovery packets, are confined to a single VNET. By confining the multi-destination packets to a single VNET, unicast packets generated within the virtual LAN are then also naturally confined to that VNET. Packets are naturally confined to the VNET, because the advertisement of their address, and the procedures used to discover the addresses of others, are prevented from exiting the-VNET of the particular node which issues the multi-destination packet. The present invention elegantly controls proliferation of multicast/broadcast traffic in large virtual LANs and confines unicast traffic to the VNET of the source, without introducing the complexities of prior art techniques to divide large virtual LANs into several smaller ones.

According to this aspect of the invention, the virtual net server automatically configures itself in response to the multi-destination packets received at the virtual net server, and in response to the layer three networks set up in the virtual LAN. Thus, when a virtual net server receives a multi-destination packet, it determines a virtual net domain based on the layer three network protocol and logical network which originated the packet, and the source medium access control (MAC) address of the packet. If a packet is received from a source node which had not previously sent a packet using the identified logical network identifier, then a connection is set up between the virtual net server and that source node, adding the new node to the appropriate virtual net domain. Thus, the virtual net domain is defined as a group of nodes intended to receive multi-destination packets from members of a particular VNET determined by a layer three network protocol/network identifier.

The present invention is particularly suited to connectionless backbone networks, such as FDDI, Ethernet or Token Ring LANs, using either a centralized or distributed virtual net server. In the centralized embodiment, the virtual net server is contained in the backbone LAN. In a distributed embodiment, edge devices provide management of the multi-destination packets.

According to one aspect of the invention, it can be characterized as a method for managing traffic in the network which includes a set of local area network segments, a connectionless backbone, and a plurality of edge devices which interconnect the set of LAN segments with the backbone. The method according to this aspect, and using a centralized server, includes:

detecting in an edge device on an originating LAN segment, a multi-destination packet in response to a medium access control MAC address in the multi-destination packet;

supplying the multi-destination packet from the edge device as a single destination message in the backbone to a virtual net server;

determining in response to the multi-destination packet, in the virtual net server, the virtual network of the source of the packet, and producing a plurality of single destination messages identifying nodes authorized to receive multi-destination packets from members of the determined virtual network;

forwarding across the backbone the plurality of single destination messages to edge devices coupled to LAN segments through which the authorized nodes are accessible; and supplying the multi-destination packet from the edge devices receiving the single destination messages from the virtual net server, to LAN segments, other than the originating LAN segment, through which authorized nodes identified in the respective single destination messages are accessible.

The plurality of single destination messages are composed by encapsulating the multicast packet in single destination packets addressed to agents in each edge device through which nodes that are members of the particular virtual net domain are accessible. In the edge device, the virtual channel connection is mapped to ports of the edge device through which nodes are accessible that are members of the particular virtual net domain associated with the virtual channel. This mapping may be done in response to the source address of the multi-destination packet during the configuration process.

Alternative systems may use other types of backbone networks, including connection-oriented backbone networks.

Accordingly, a low-cost virtual LAN/virtual net (VLAN/VNET) architecture has been provided. Edge devices operate at layer 2, based on MAC address filtering. The layer 3 multi-protocol complexities are confined in the virtual net server on the backbone LAN. However, the layer 3 multi-protocol complexity only includes components necessary to decode and forward the multi-destination frames. Furthermore, the virtual NET server, the edge devices and adapters automatically learn virtual net domains of LAN segments and nodes in the system.

Unicast frames are relayed at layer 2 and automatically stay within their appropriate virtual net domains, by the inherent control of address advertisement and discovery procedures and the like.

The present invention greatly improves flexibility of network architectures by managing the flow of traffic within virtual LANs. The invention allows the creation of a plurality of VNETs within the virtual LAN according to guidelines unique to each installation, such as shared access to services, using existing logical network constructs of standard layer three protocols.

Other aspects and advantages of the present invention can be seen upon review of the figures, the detailed description and the claims which follow.

DETAILED DESCRIPTION

Figure 1:
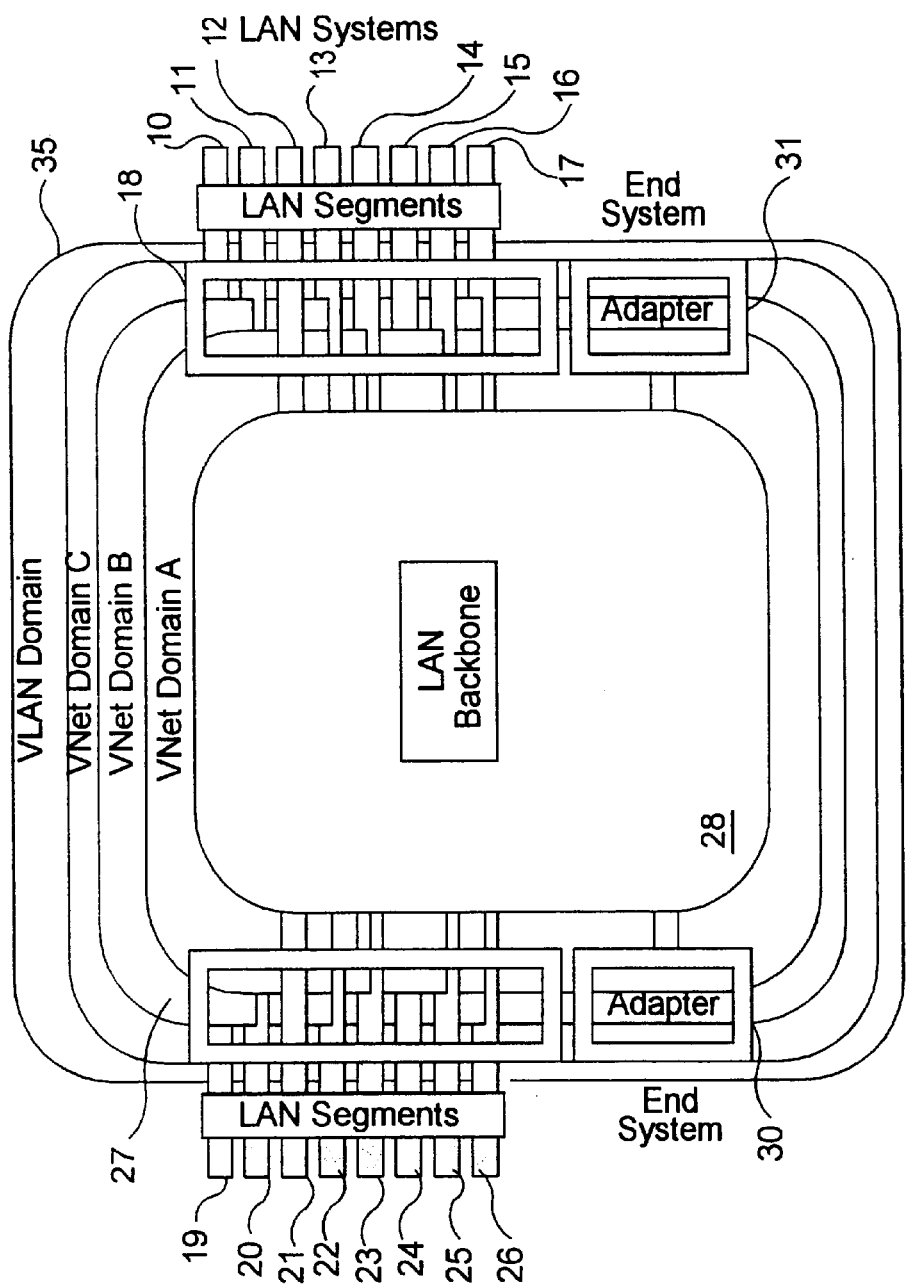
FIG. 1 provides a conceptual overview of a network configured with virtual LAN domains and virtual net domains according to the present invention.

FIG. 1 provides a conceptual overview of a network in which the present invention operates. The network includes a plurality of LAN segments coupled to end systems or nodes on the network. The LAN segments include segments 10–17 which are connected to an edge device 18, and segments 19–26 which are coupled to edge device 27. A backbone network 28 is coupled to each of the edge devices 18 and 27 to provide interconnection among the LAN segments. Also coupled to the backbone network, may be adapters, such as adapters 30 and 31 which connect directly to end systems. Within the wired network which includes the LAN segments, edge devices, adapters and the backbone, a virtual LAN domain 35 may be established as a layer two construct. Many virtual LANs may be implemented using higher layer procedures, such as described in the Ross patent referred to above or otherwise, but the example of one virtual LAN is used to illustrate the present invention.

According to the present invention, multiple virtual net domains, including virtual net domain C, virtual net domain B and virtual net domain A are set up within a single virtual LAN domain 35. A virtual net domain is defined as the set of LAN segments/ATM systems that are members of the same network layer protocol logical networks which are identified by a unique network layer identifier, and may be extended to include other nodes intended to receive packets from members of this logical network.

Virtual LAN domains contain numerous interconnected LAN segments, each with one or more attached systems (desktops, servers, routers, etc.) interconnected across a backbone 28. The utilized protocol stacks within the network (e.g. IP, IPX) must be able to function properly within the virtual LAN domain.

A virtual network configuration is utilized when variant network layer protocols, and logical networks are used within the virtual LAN. For example, a single virtual LAN wide virtual net domain may be created for IP, while requiring creation of several IPX virtual net domains. Each LAN segment end system can be then individually attached to differing IPX VNETs based on policies such as desired services. Also, separate VNET domains may be created for many IP subnets and many IPX networks. Each LAN segment end system can be then individually attached to both IP and IPX VNET domains based on policies such as desired services. Within a single virtual LAN domain, LAN segments and end systems may attach to multiple VNET domains.

According to the present invention, the flow of multicast /broadcast MAC frames are kept within the associated VNET domain. All unicast MAC frames are sent across the standard virtual LAN. However, the interesting point is that each unicast frame will be addressed at layer 2 to stay within its VNET domain automatically. This means the edge devices are fast, inexpensive and simple while the VLAN/ VNET architecture is optimized.

Figure 2:
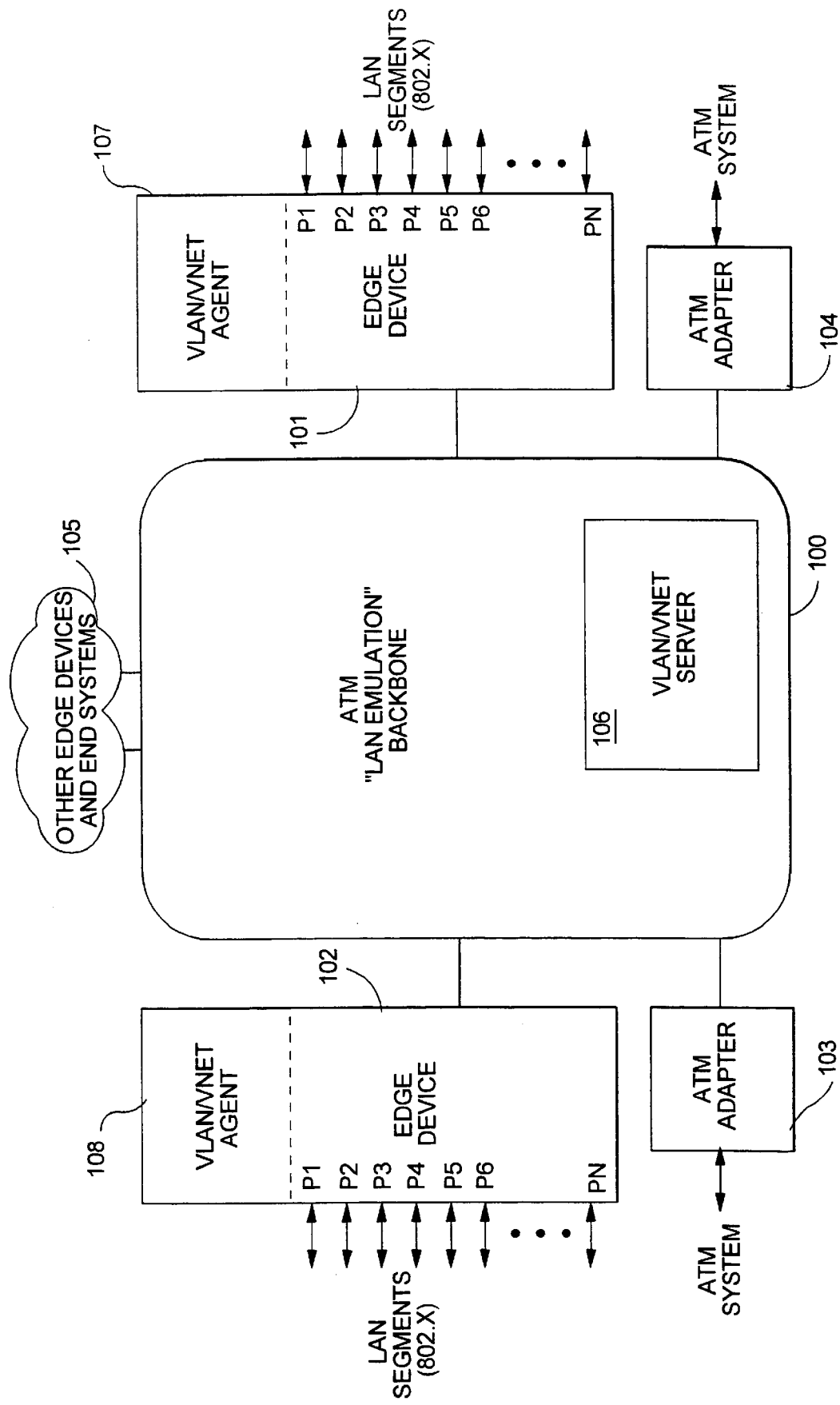
FIG. 2 is a schematic diagram of a network implementing the VLAN/VNET architecture of the present invention across an ATM LAN emulation backbone.

FIG. 2 illustrates the architecture of a network using ATM LAN emulation backbone with the VLAN/VNET architecture of patent application of which this is a continuation-in-part. The ATM Forum specifies a so-called LAN emulation mode by which LAN segments, and end systems directly attached by ATM adapters to the backbone, are interconnected across an ATM backbone establishing a so-called emulated LAN in the ATM environment. *LAN Emulation Over ATM Specification,* published by the ATM Forum, LAN Emulation SWG Drafting Group.

According to the ATM LAN emulation specifications, multi-destination packets are detected at edge devices and forwarded to a broadcast and unknown server (BUS) on the ATM backbone. The BUS takes the multi-destination packet received from an edge device, and generates a number of virtual channels to forward the multi-destination packet from the BUS, one virtual channel to each of the nodes in the emulated LAN. According to this technique, it is insured that, from the point of view of the sender of the packet, the multi-destination packet is fanned out across the point-to-point ATM backbone, like a broadcast or multicast frame would have been transmitted across a standard connection-less LAN backbone.

As can be seen in FIG. 2, an ATM LAN emulation backbone 100 is provided which is coupled to a first edge device 101 and a second edge device 102. Edge device 101 includes N ports P1-PN as illustrated in the figure. Each of the ports is coupled to a corresponding LAN segment executing a connectionless protocol, such as specified IEEE 802.x standards or other protocols like the ANSI standard Fiber Distributed Data Network (FDDI). For instance, a carrier sense multiple access with collision detect protocol such as specified in 802.3 (also called Ethernet), and a token ring protocol such as specified in 802.5 may be coupled to various ports of the edge device 101. In the same manner, edge device 102 has plurality of ports P1-PN as shown in the figure coupled to a variety of LAN segments. With the ATM LAN emulation backbone, an ATM adapter 103 and an ATM adapter 104 may be coupled directly to the backbone. The adapters 103 and 104 are coupled directly to ATM end systems.

As represented by the cloud 105, a variety of other edge devices and ATM adapters may be coupled to the LAN emulation backbone 100, to establish a virtual LAN over a wide variety of LAN segments and across wide area links.

According to the present invention, a virtual net server 106, such as in an improved BUS (Broadcast and Unknown Server) in a directly attached ATM end system or in an ATM switch, is coupled to the backbone 100. Also, virtual net agents 107 and 108 are implemented in the edge devices 101 and 102. When a multicast frame is detected on a LAN segment in an edge device 101, the multicast packet is forwarded to the virtual net server 106 across the LAN emulation backbone in the manner that such packets are forwarded to the BUS. Virtual net server 106 translates the multi-destination packet into plurality of directed messages which are sent across virtual channels to the virtual net agents in the edge devices, such as agents 107 and 108. The virtual net agents 107, 108 then forward the multi-destination packet out ports of the edge device on which nodes authorized receive the multi-destination packet are found. When there is one user on each LAN segment, the multi-destination packet can be delivered exclusively to members of the virtual net domain.

Figure 3:
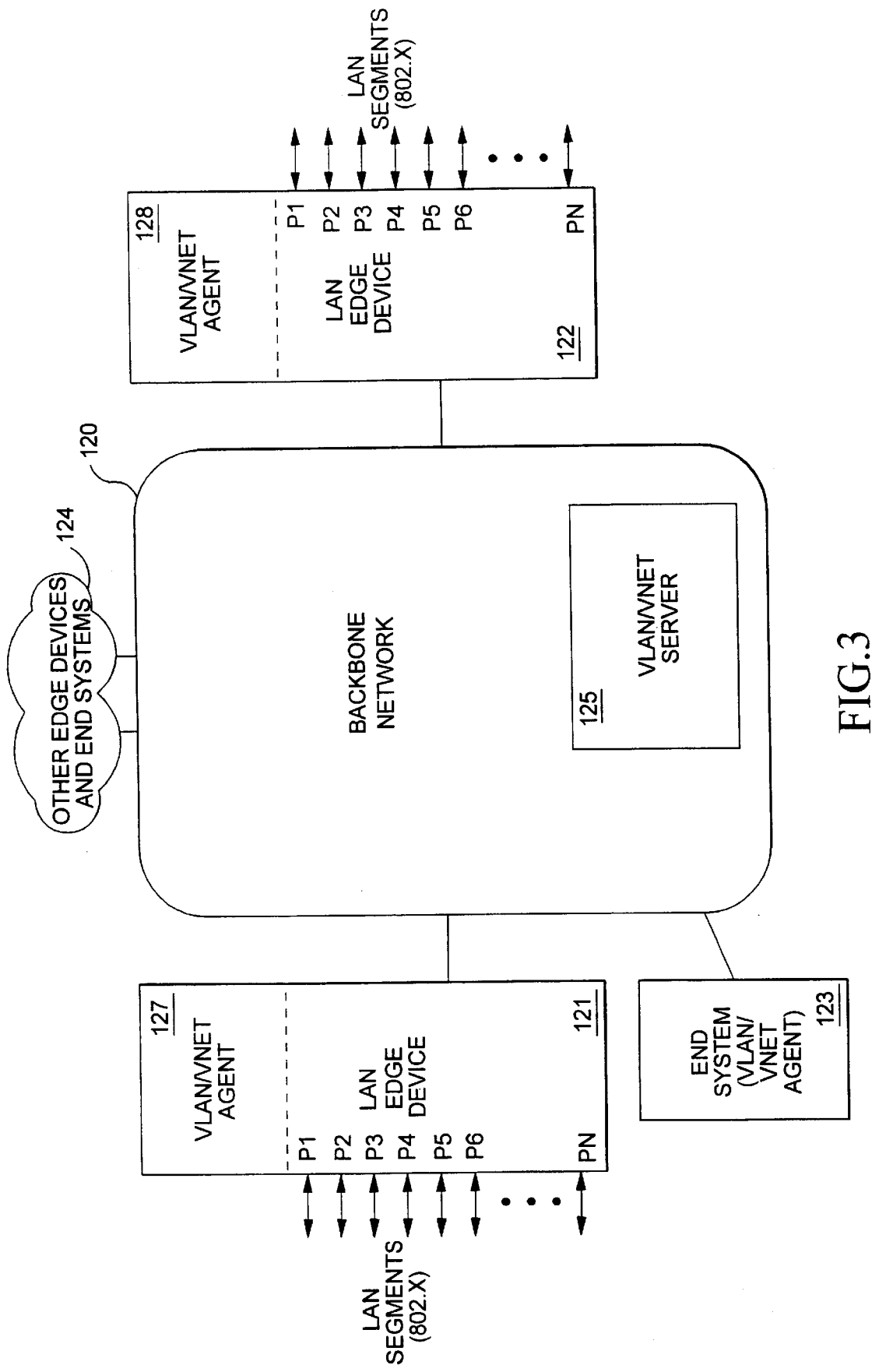
FIG. 3 is a schematic diagram of a network implementing the VLAN/VNET architecture of the present invention across a connectionless LAN backbone.

FIG. 3 illustrates the architecture of a network using virtual net architecture according to the present invention with a backbone network which may be implemented using a connectionless protocol such as FDDI, Ethernet or Token Ring. Thus, as can be seen in FIG. 3, a backbone network 120 is coupled to a first edge device 121 and a second edge device 122. The edge device 121 includes ports P1-PN as illustrated in the Fig. Each of the ports is coupled to a corresponding LAN segment executing a connectionless protocol such as specified in 802.X standards or other protocols. Alternatively, one or more ports may be connected to an ATM edge device which extends the virtual LAN across an ATM emulation backbone.

In the same manner, edge device 122 has a plurality of ports P1-PN as shown in FIG. 3, coupled to a variety of LAN segments. Also, an end system 123 may be coupled directly to the backbone network 120. As represented by the cloud 124, a variety of other edge devices and end systems may be coupled to the backbone 120, to establish a virtual LAN over a wide variety of LAN segments and across wide area links.

According to the present invention, a virtual LAN and virtual net server 125 (VLAN\VNET server) is coupled to the backbone network 120, such as in an end system on the backbone network, or in a network intermediate system device like a router, bridge or switch on the backbone network 120. Also, virtual net agents 127 and 128 are implemented in the edge devices 121 and 122 respectively. When a multicast frame is detected on a LAN segment in an edge device 121, the multi-cast packet is tunneled to the VLAN\VNET server 125 through the backbone network. The server 125 translates the multi-destination packet into a plurality of tunneled messages which are sent to virtual net agents 127 and 128 in the edge devices coupled to the backbone network 120. The virtual net agents 127 and 128 then forward the multi-destination packet out port of the edge device on which nodes authorized to receive the multi-destination packet are found. When there is one user on each LAN segment, the multi-destination packet can be delivered exclusively to members of the virtual net domain using this architecture.

Figure 4:
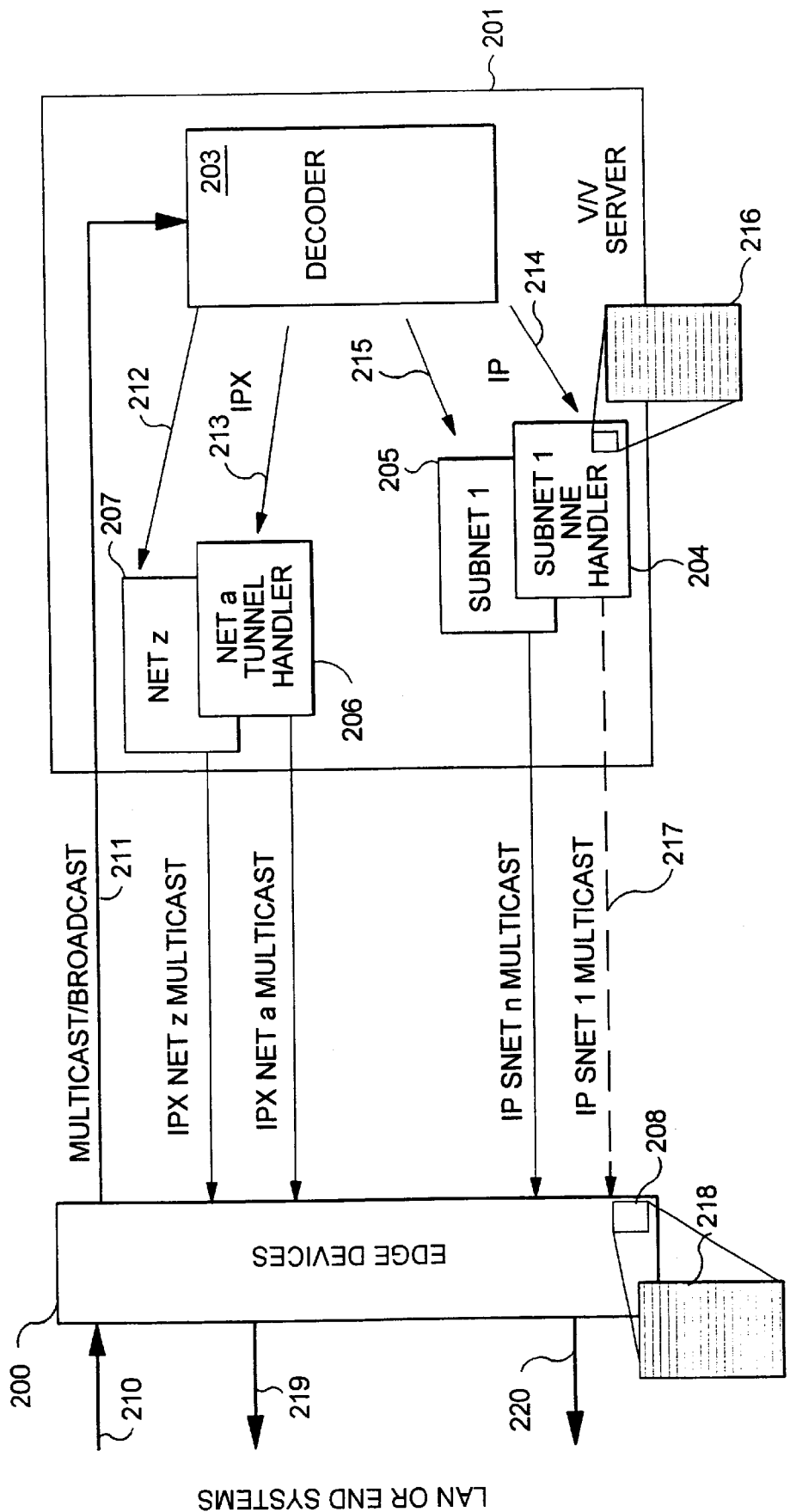
FIG. 4 is a functional diagram of the virtual net server and virtual net agent system used according to the architecture of FIG. 3.

FIG. 4 provides a functional diagram of the virtual net server and virtual net agent used according to the system of FIG. 3. Thus, an edge device 200 is illustrated in the figure. A server 201 is coupled to the edge device 200 across the LAN backbone.

The server 201 includes a decoder 203, and a plurality of virtual net tunnel modules 204, 205, 206, 207. The edge device 200 includes an agent 208 which operates with the server 201.

In operation, an edge device 200 receives on an incoming port 210 from an originating LAN segment a multicast or broadcast packet. This packet is then routed using tunneling 211 under control of the agent 208 to the server 201.

The decoder 203 in the virtual net/virtual LAN server 201 (V/V server) determines the virtual net domain of the packet in response to the network protocol of the multicast/broadcast packet and the network identifier, if used in the identified protocol, by layer three protocol constructs in the packet. It then passes the multi-destination packet to the appropriate virtual net tunnel module. A virtual net domain exists for each network address value (for example each IP subnet value) supported by a given network protocol. When the frame does not contain a network identifier (for instance a NetBIOS frame) only one virtual net tunnel module exists for it in the server 201. Thus, if the multicast/broadcast packet is an IPX packet, then it is forwarded across either line 212 or line 213 to the VNET tunnel module 206 or module 207 for corresponding network identifiers. If the multicast/broadcast packet is an IP protocol packet, then it is forwarded across line 214 or line 215 to one of the VNET tunnel modules 204 or 205 for corresponding subnets. For the purposes of this example, the packet is passed to the subnet 1 tunnel module 204. The subnet 1 tunnel module 204 includes a table 216 which maps the virtual net domain to established tunnels in the backbone. Established tunnels provide direct paths (e.g. 217) by means of single destination packets to agents in edge devices 200 on which ports authorized to receive the frame are found. Thus, in this example, the agent 208 in the edge device 200 receives the multicast packet across tunnel 217 and forwards the packet out the appropriate ports. The agent includes table 218 which maps the tunnel on which the multicast packet is received, to ports on which nodes authorized to receive the packet are found, using the source MAC address of the packet to make sure that it is not sent back on the originating LAN segment 210. In the illustrated example, the packet is sent on port 219 and port 220 by the agent 208, but not on other ports of the edge device and not on the port coupled to originating LAN segment 210.

Alternatively, a VNET encapsulation can be utilized which provides the ability for each of the virtual net tunnel modules to share tunnel addresses established for each of the edge devices. However, the agent at the edge device must be able to handle the decapsulation of the frame as it received and route it appropriately.

Standard end system adapters can utilize this virtual net architecture. The configuration steps are not required for end systems because there is no edge device connected to them which operates as a proxy for other LAN segments. Since the directly connected end systems do not register as proxies within the server, the end system is automatically distinguished from an edge device. Thus, only one tunnel per virtual LAN is set up from the server to the end system. All associated virtual net membership entries set the tunnel identifier values to the same tunnel for the adapter. In the configuration process, the virtual net membership entry, layer two MAC address is not forwarded to the end system adapter, because it is not necessary for use there.

Unicast frames are forwarded using the standard LAN processing mode, and are naturally confined their own virtual net domain. Optionally, a unicast privacy checking algorithm can be added, by having the edge devices check with the V/V server 201, the first time they see a destination value from a LAN segment. From the membership lists in the server 201, it can be verified that the source and destination addresses remain within the same virtual net domain.

Figure 5:
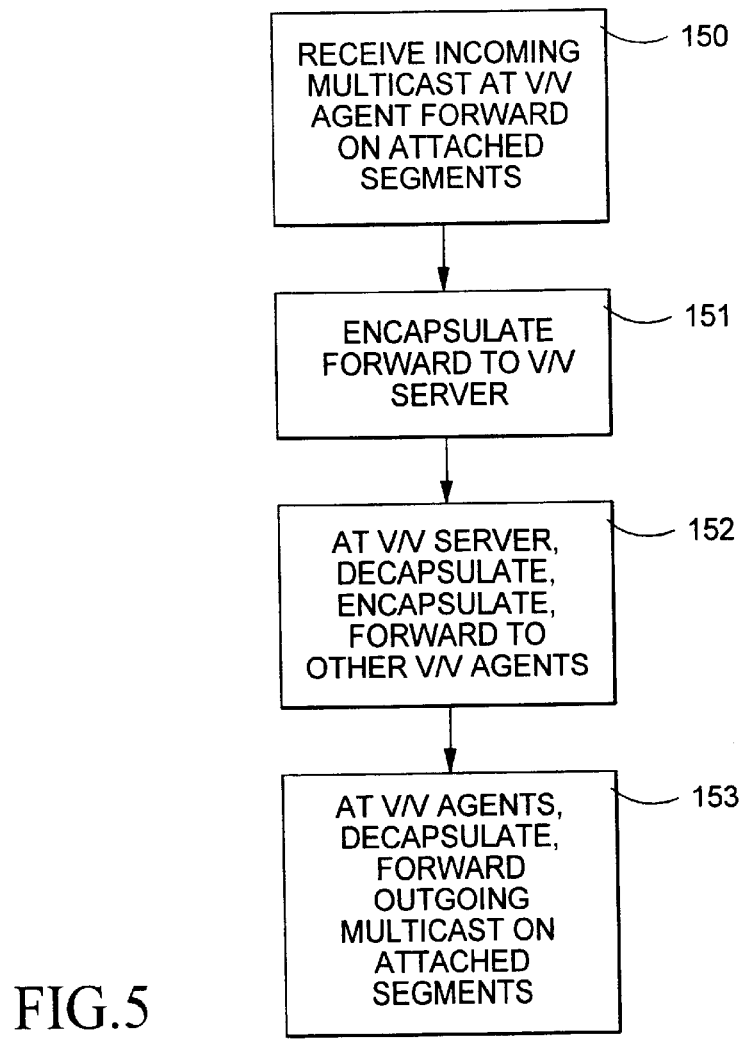
FIG. 5 is a flow chart of the basic tunnelling process used in the system of FIGS. 3 and 4.
Figure 6:
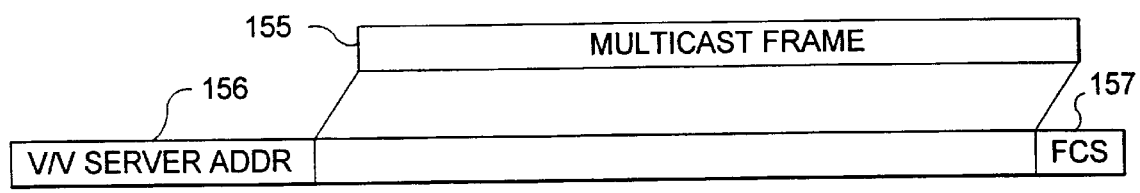
FIGS. 6 and 7 illustrate encapsulation of multicast packets for the tunnelling process.
Figure 7:
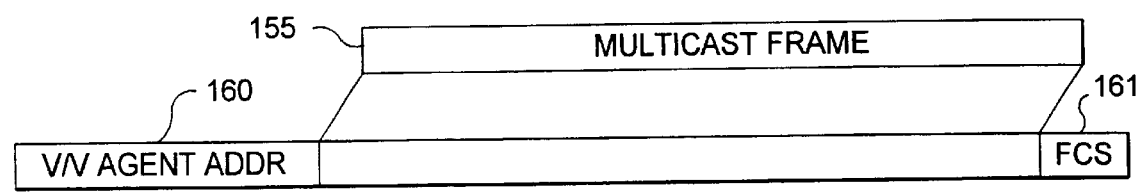

The basic tunneling process according to the present invention is illustrated with respect to FIGS. 5, 6 and 7. In FIG. 5, the basic process is described, which begins with receiving an incoming multicast packet at a virtual net agent on an edge device. The edge device forwards the multicast packet on attached segments, with or without filtering by virtual net domain (block 150). Alternatively, it may defer forwarding the packet on attached segments until it receives the multicast back from the server.

Next, the virtual net agent encapsulates the multicast packet and tunnels it to the virtual net/virtual LAN server on the backbone network (block 151). At the virtual LAN/ virtual net server, the multicast packet is decapsulated from the tunneled message, and encapsulated in a new tunnel packet for forwarding to other virtual net agents (block 151). At the agents, the tunneled messages are decapsulated, and the outgoing multicast packets is forwarded on attached segments, other than the segment which originated the message and segments which already received the message (block 153).

The tunneling process can be understood with references to FIGS. 6 and 7. Basically, tunneling involves encapsulating a multi-destination packet in a single destination packet having a MAC address of the destination of the tunnel, and a source address equal to the source of the tunnel. Thus, the agent in the edge device will encapsulate the message as illustrated in FIG. 6 where the multicast frame 155 is encapsulated in a single destination packet having the server address 156 as a destination address and other supporting control fields, such as the frame check sequence 157, surrounding the multicast frame 155. At the receiving end of the tunnel, the server receives the frame and processes it. It discovers that the frame is a tunneled multicast frame, and using the process described with respect to FIG. 4, encapsulates the frame in a tunnel directed to the agent as shown in FIG. 7. Thus, a tunnel from the server to the agent will carry destination address equal to the agent address 160, the multicast frame 155 will be encapsulated within the packet. Supporting control fields, such as the frame check sequence 161 and the like, are included within the tunneled packet.

The tunneling process can take a variety of formats. For instance, each tunnel may be established by setting up a specific destination and source address for each tunnel handler/edge device pair. This way, the agent and server must maintain a number source and destination addresses, and correlate those with specific VNETs. Alternatively, a single address may be used for the server and a single address used for each agent, and the tunnel packet will carry control fields which specify the information needed to recognize the packet as a tunneled packet.

Figure 8:
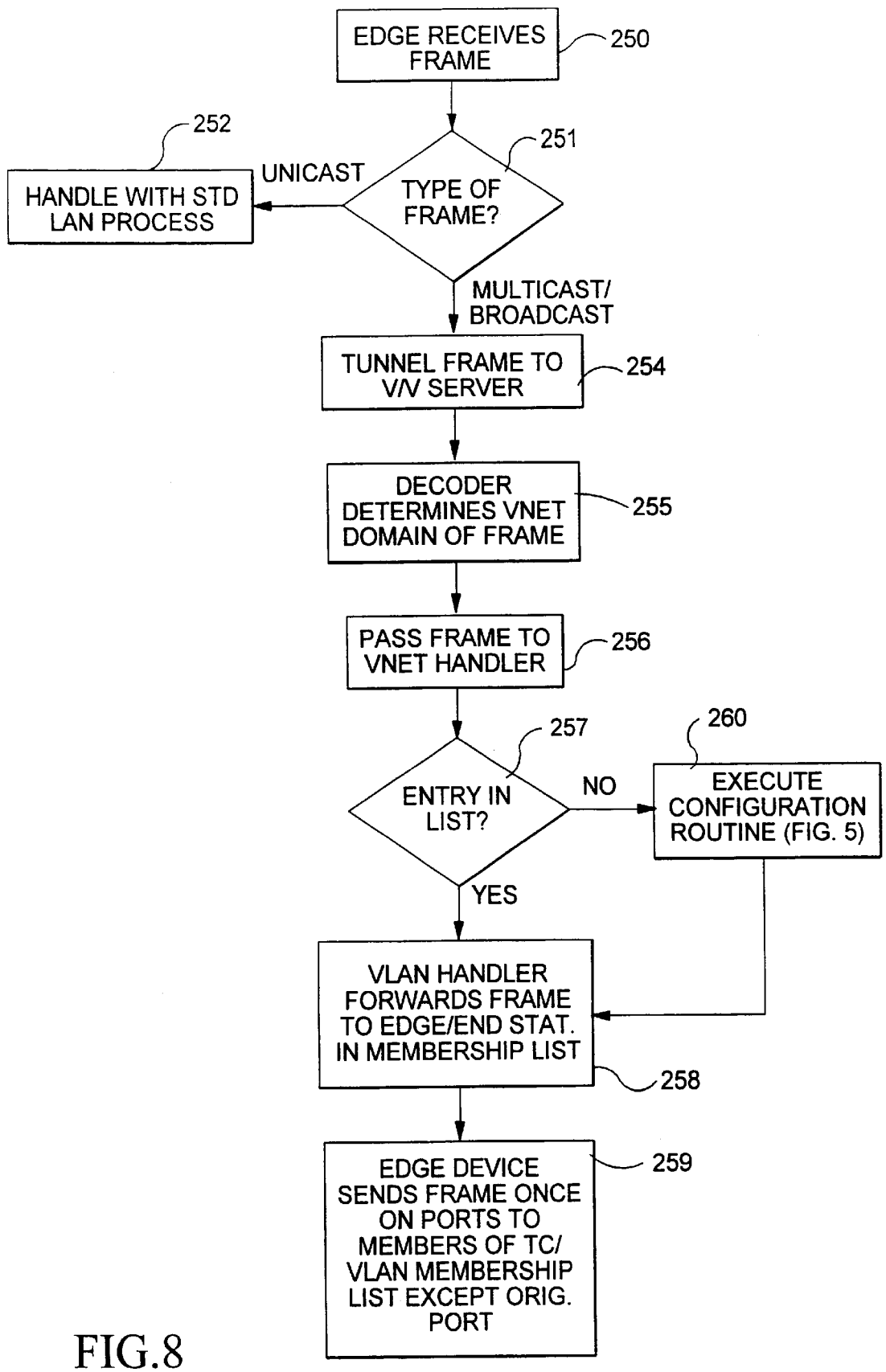
FIG. 8 is a flow chart illustrating the process executed by the virtual net server and agent of FIG. 3 with a centralized server.

FIG. 8 provides a flow chart illustrating the handling of multicast and broadcast packets according to a centralized server embodiment of this system. The process begins when an edge device receives a frame (block 250). The device determines the type of frame (block 251). If frame is a unicast frame, then it is handled with standard LAN techniques (block 252). If the frame is a multicast or broadcast, then the edge device forwards the frame using tunneling to the V/V server (block 254).

In the server, the decoder determines the virtual net domain of the frame (block 255). Then the frame is passed to the determined virtual net tunnel handler (block 256). The virtual net tunnel handler determines whether the source of the multicast packet has a corresponding entry in its membership list (block 257). If an entry is found, then the frame is forwarded as a tunneled message as set up in the membership list (block 258).

If no entry was found in the membership list at the virtual net tunnel handler in the test of block 257, then an automatic configuration routine is executed (block 260). After the configuration routine, then the process proceeds to block 258 to forward the frame across the established tunnels for the virtual net tunnel handler.

The process of block 258 results in edge devices receiving the multicast/broadcast frame. Each edge device which receives the multicast/broadcast frame, then sends the frame once on ports to members of the virtual net domain. This is done by the edge device maintaining a table which maps the tunnel on which the frame is received to specific ports, or modules accessible through the ports, of the edge device. However, the edge device does not send the multicast packet back out on the segment which originated the packet. This is determined by checking the source address of the multicast/broadcast frame, and comparing that source address with the address of devices on the respective ports (block 259).

Figure 9:
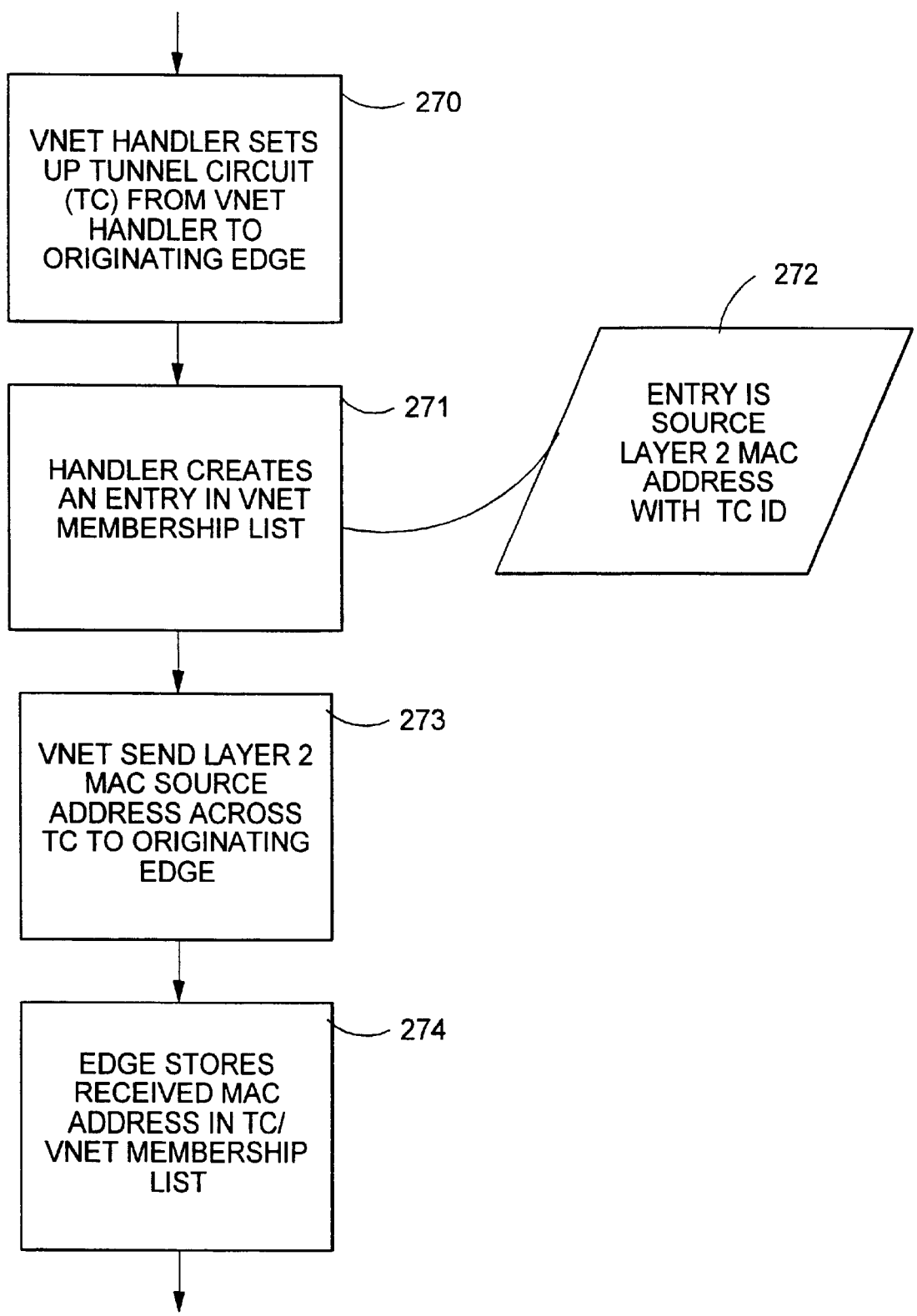
FIG. 9 is a flow chart illustrating the configuration routine referred in the flow chart of FIG. 8.

FIG. 9 illustrates the configuration routine executed at block 260 of FIG. 8. According to this routine, the virtual net tunnel handler sets up a tunnel from the virtual net tunnel handler to the originating edge device (block 270). An entry is created in the virtual net membership list for the source of the packet (block 271). The entry includes a source MAC address of the originating end station and a tunnel identifier (i.e. MAC address of the agent in the edge device) (block 272). After creating the entry, the virtual net tunnel handler sends the source MAC address across the established tunnel to the originating edge device (block 273). The edge device then stores the received source MAC address in the virtual channel/virtual net membership list maintained by the agent (block 274). This MAC address is utilized to map incoming frames on this tunnel to the appropriate ports of the edge device.

Utilizing the process of FIGS. 8 and 9, each virtual net tunnel handler 204, 205, 206, 207 as shown in FIG. 4, establishes a tunnel to each edge device which includes a port through which a member of the virtual net domain is found. These established tunnels provide a mechanism for distributing the multiple destination packets efficiently across the backbone. The decoder in the server 201 maps the incoming packet to the virtual net tunnel handler which maps the frame based on a membership list to a set of established tunnels. The edge devices map frames incoming on specific tunnels to ports of the edge device. This tightly controls the propagation of multiple destination packets within the appropriate virtual net domain of the originating device.

Figure 10:
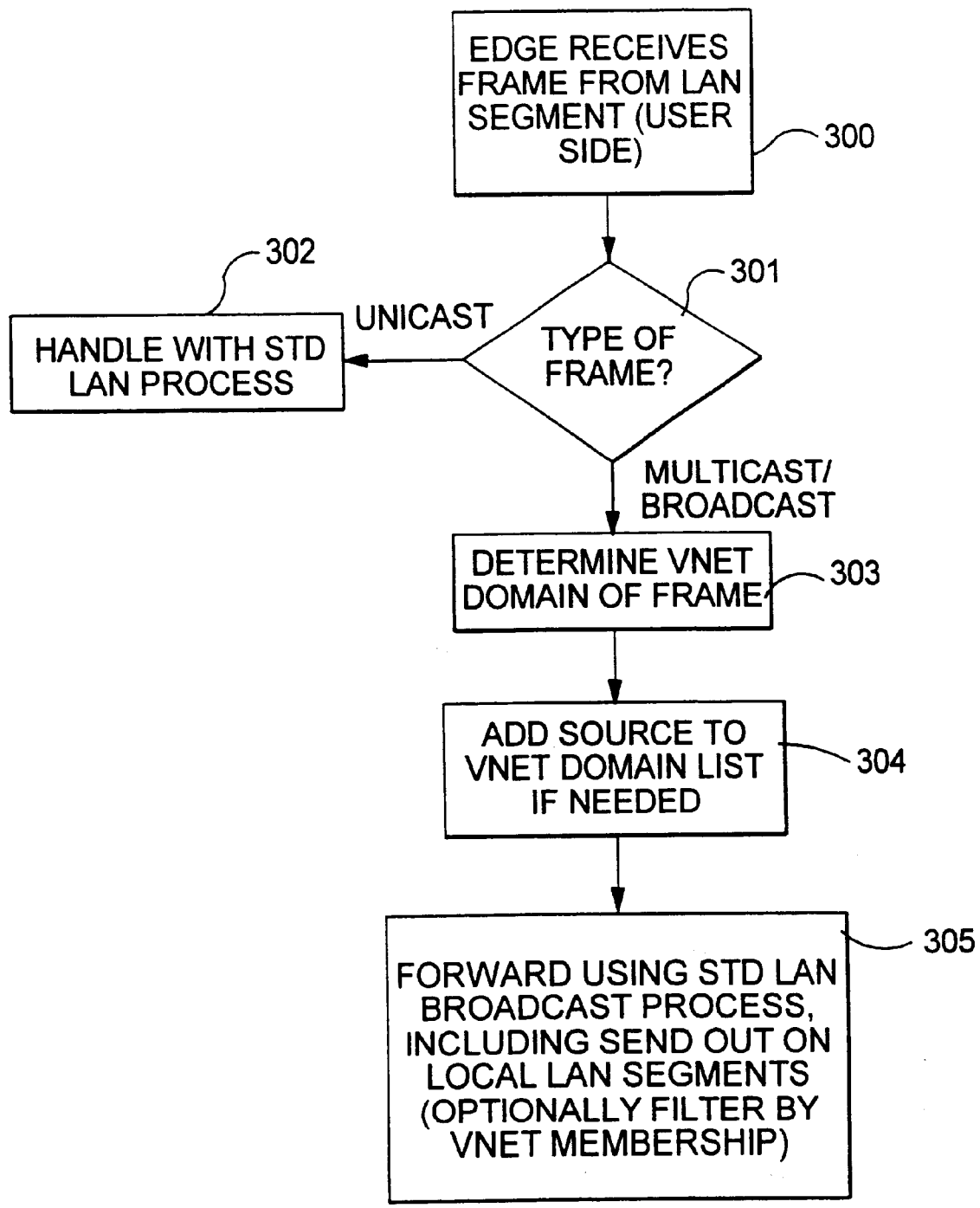
FIG. 10 is a flow chart illustrating a process executed by a distributed virtual net server, located on an edge device for a packet received from a LAN segment.
Figure 11:
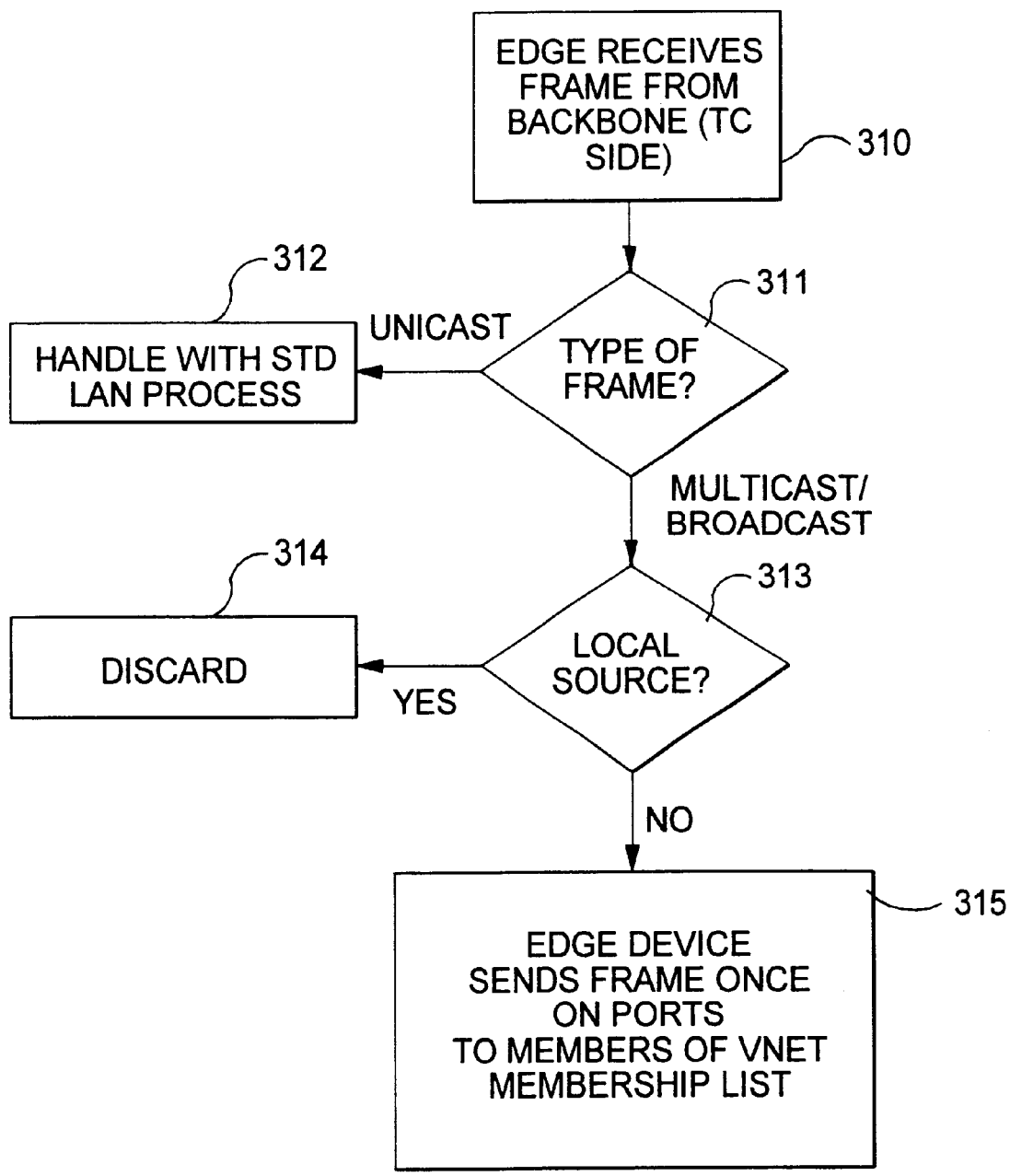
FIG. 11 is a flow chart illustrating the process executed by the distributed virtual net server of FIG. 10, when executed in response to a packet received from the backbone side of the edge device.

As mentioned above, the V/V server can be distributed to the edge devices, rather than executed in a centralized site. FIGS. 10 and 11 illustrate a process which is executed in the edge devices according to this distributed virtual net server model. Thus, in FIG. 10, the process executed by the edge device when it receives a packet from the LAN segment on the user side of the edge device is shown. The process begins with receiving a packet from the user side (block 300). The process then determines the type of frame (block 301). If it is a unicast frame, then it is handled with standard LAN procedures (block 302). If it is a multicast or broadcast packet, the distributed virtual net server determines the VNET domain of the frame (block 303). The source address of the multicast packet is added to a VNET domain list which is maintained in the edge device, if it is not already there (block 304). Finally, a multicast packet is forwarded using tunneling to other edge devices, and sent on local LAN segments. Optionally, transmission on the local LAN segments can be filtered by VNET membership (block 305).

The process shown in FIG. 11 is executed by edge devices receiving a packet from a tunnel from other edge devices.

Thus, the process begins with receiving a frame from the tunnel on the backbone network (block 31 0). The edge device next determines the type of frame (block 311). If it is a unicast frame, it is handled with the standard LAN processes (block 312). If the frame is a multicast or a broadcast packet, the edge device determines whether the packet has a local source address (block 313). If it has a local source address, then it is discarded (block 314), because the process described in FIG. 10 has already forwarded the packet to the local LAN segments. If the packet does not have a local source address, then the edge device sends the frame once on ports coupled to members of the virtual net membership list which matches the multicast packet (block 315). Accordingly, the virtual net server can be distributed to the edge devices in the virtual LAN architecture.

The present invention provides management of traffic in a virtual LAN environment according to the concept of a virtual net domain. To maintain virtual net domain boundaries, edge devices operate at layer 2, while limited layer 3 complexity is centralized in, for example, an improved server, or alternatively in a distributed virtual net server. The virtual net server, the edge devices and adapters automatically learn virtual net domain membership among nodes on connected LAN segments.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. For a network including a set of local area network (LAN) segments interconnected as a virtual LAN in which nodes in the virtual LAN are members of one or more logical networks, a method for managing traffic in the network, comprising:

detecting a broadcast packet on a LAN segment within the set;

supplying the detected broadcast packet to a server;

determining the logical network for which the detected broadcast packet is intended based upon a comparison of a detected broadcast packet's source against a membership list; and confining the broadcast packet to nodes in the determined logical network.

2. The method of claim 1, including after said step of detecting:

tunneling the detected broadcast packet by a single destination packet to the server; and producing a plurality of single destination messages in the server to deliver the information carried by the broadcast packet.

3. The method of claim 1, wherein the network includes a connectionless backbone communication path and a plurality of edge devices which interconnect the set of LAN segments and the backbone communication path, and including:

detecting in a particular edge device, a broadcast packet on a particular LAN segment in response to a medium access control MAC layer address in the broadcast packet;

tunneling the broadcast packet detected in the particular edge device from the particular edge device across the backbone communication path to the server; and producing a plurality of single destination messages in the server to deliver the information carried by the broadcast packet detected in the particular edge device.

4. The method of claim 3, wherein a connectionless protocol of the backbone network comprises one of a carrier sense multiple access protocol and a token passing ring protocol.

5. The method of claim 2, including:

forwarding the plurality of single destination messages to edge devices; and supplying in the respective edge devices, the information from the broadcast packet to LAN segments associated with the single destination message received in the edge device.

6. The method of claim 2, including:

automatically learning the logical networks of which nodes on the set of LAN segments are members in response to the detected broadcast packets.

7. A method of communication comprising:

interconnecting a set of local area network (LAN) segments as a virtual LAN in which nodes in the virtual LAN are members of one or more logical networks, the logical networks defined at a particular layer, the particular layer being different from a layer at which the virtual LAN is defined;

detecting a multicast packet on a LAN segment within the set, the multicast packet having a multi-destination address of a layer lower than the particular layer and defining a set of recipients;

supplying the detected multicast packet to a server;

determining the logical network for which the detected multicast packet is intended based upon a comparison of a detected multicast packet's source against a membership list, the logical network including a subset of the set of recipients; and confining the multicast packet to nodes in the virtual LAN authorized to receive multi-destination packets intended for members of the determined logical network.

8. The method of claim 7, the particular layer comprising layer 3 or higher.

9. The method of claim 7, the layer lower than the particular layer comprising MAC layer.

10. The method of claim 7, including after said step of detecting:

tunneling the detected multicast packet by a single destination packet to the server; and producing a plurality of single destination messages in the server to deliver the information carried by the multicast packet.

11. The method of claim 7, wherein the Virtual LAN includes a connectionless backbone communication path and a plurality of edge devices which interconnect the set of LAN segments and the backbone communication path, and including:

detecting in a particular edge device, a multicast packet on a particular LAN segment in response to a medium access control MAC layer address in the multicast packet;

tunneling the multicast packet detected in the particular edge device from the particular edge device across the backbone communication path to the server; and producing a plurality of single destination messages in the server to deliver the information carried by the multicast packet detected in the particular edge device.

12. The method of claim 11, wherein a connectionless protocol of the backbone network comprises one of a carrier sense multiple access protocol and a token passing ring protocol.

13. The method of claim 10, including:
forwarding the plurality of single destination messages to edge devices; and
supplying in the respective edge devices, the information from the multicast packet to LAN segments associated with the single destination message received in the edge device.

14. The method of claim 10, including:
automatically learning the logical networks of which nodes on the set of LAN segments are members in response to the detected multicast packets.

15. For a network including a set of local area network (LAN) segments interconnected as a virtual LAN in which nodes in the virtual LAN are members of one or more logical networks, a method for managing traffic in the network, comprising:
detecting a broadcast packet on a LAN segment within the set, the broadcast packet having a MAC layer broadcast address;
supplying the detected broadcast packet to a server;
determining the logical network for which the detected broadcast packet is intended based upon a comparison of a detected broadcast packet's source against a membership list; and
confining the broadcast packet to nodes in the virtual LAN authorized to receive multi-destination packets intended for members of the determined logical network.

16. The method of claim 15, including after said step of detecting:
tunneling the detected broadcast packet by a single destination packet to the server; and
producing a plurality of single destination messages in the server to deliver the information carried by the broadcast packet.

17. The method of claim 15, wherein the network includes a connectionless backbone communication and a plurality of edge devices which interconnect the set of LAN segments and the backbone communication path, and including:
detecting in a particular edge device, a broadcast packet on a particular LAN segment in response to a medium access control MAC layer address in the broadcast packet;
tunneling the broadcast packet detected in the particular edge device from the particular edge device across the backbone communication path to the server; and
producing a plurality of single destination messages in the server to deliver the information carried by the broadcast packet detected in the particular edge device.

18. The method of claim 17, wherein a connectionless protocol of the backbone network comprises one of a carrier sense multiple access protocol and a token passing ring protocol.

19. The method of claim 16, including:
forwarding the plurality of single destination messages to edge devices; and
supplying in the respective edge devices, the information from the broadcast packet to LAN segments associated with the single destination message received in the edge device.

20. The method of claim 16, including:
automatically learning the logical networks of which nodes on the set of LAN segments are members in response to the detected broadcast packet.

21. A method of communication comprising:
interconnecting a set of local area network (LAN) segments as a virtual LAN in which nodes in the virtual LAN are members of one or more logical networks, the logical networks defined in layer three or higher;
detecting a multicast packet on a LAN segment within the set, the multicast packet having a MAC multi-destination address defining a set of recipients;
supplying the detected multicast packet to a server;
determining the logical network for which the detected multicast packet is intended based upon a comparison of a detected multicast packet's source against a membership list, the logical network including a subset of the set of recipients; and
confining the multicast packet to nodes in the determined logical network.

22. The method of claim 21, including after said step of detecting:
tunneling the detected multicast packet by a single destination packet to the server; and
producing a plurality of single destination messages in the server to deliver the information carried by the multicast packet.

23. The method of claim 21, wherein the network includes a connectionless backbone communication path and a plurality of edge devices which interconnect the set of LAN segments and the backbone communication path, and including:
detecting in a particular edge device, a multicast packet on a particular LAN segment in response to a medium access control MAC layer address in the multicast packet;
tunneling the multicast packet detected in the particular edge device from the particular edge device across the backbone communication path to the server; and
producing a plurality of single destination messages in the server to deliver the information carried by the multicast packet detected in the particular edge device.

24. The method of claim 23, wherein a connectionless protocol of the backbone network comprises one of a carrier sense multiple access protocol and a token passing ring protocol.

25. The method of claim 22, including:
forwarding the plurality of single destination messages to edge devices; and
supplying in the respective edge devices, the information from the multicast packet to LAN segments associated with the single destination message received in the edge device.

26. The method of claim 22, including:
automatically learning the logical networks of which nodes on the set of LAN segments are members in response to the detected multicast packets.

* * * * *